Patented Jan. 14, 1936

2,027,387

UNITED STATES PATENT OFFICE 2,027,387

FLAVORING OF FOODSTUFFS

Lucas P. Kyrides, Webster Groves, and Henry H. Retailliau, St. Louis, Mo., assignors, by mesne assignments, to Monsanto Chemical Company, a corporation of Delaware No Drawing. Application May 20, 1932, Serial No. 612,628

8 Claims. (Cl. 99—11)

This invention relates to the preparation of various foodstuffs including confectionery, bakery goods, preserves, syrups and so forth, characterized in that they contain novel flavoring materials of the aldehydic class which impart a pleasing vanilla-like taste and odor to the foodstuffs.

A variety of confectionery, bakery goods, ice cream and allied foodstuffs are flavored with vanilla bean extract to impart the characteristic and well known vanilla flavor thereto. In general, the aromatic composition is added in the form of an aqueous alcoholic solution of the foodstuff in the course of its preparation. The amount added, as well as the choice of related flavoring materials which are introduced, vary widely as is well known to those skilled in the culinary arts.

Solutions of vanillin are utilized extensively in lieu of vanilla bean extract. For this purpose approximately 7-9 ounces of vanillin are dissolved in 2.5 gallons of alcohol which subsequently are diluted with water to 8-12 gallons. The water may previously have been sweetened by means of sugar or syrup. By dissolving in the alcoholic solution of vanillin approximately 20-30% by weight, based on the vanillin, of coumarin the flavor of the diluted product will be found to be distinctive, pleasant and to approximate closely that of the natural vanilla bean.

I have now discovered that alkyl ethers of protocatechuic aldehyde characterized in that the alkyl group contains 3-8 carbon atoms are capable of imparting a desirable and distinctively pleasant taste when used either alone or in combination with coumarin in a manner similar to that commonly employed in connection with vanillin or a vanilla bean extract. Although the flavor is of the vanilla genus it is nevertheless distinctive. Similarly, the odor when used in a perfume resembles the odor of vanilla but it differs in that it is perhaps not as strong as vanillin but nevertheless it is pleasing. These materials may be represented structurally, as follows:

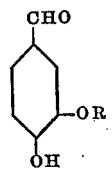

where R is a propyl, butyl, amyl, hexyl, heptyl or octyl group. When the alkyl group is displaced by other groups such, for example, as a hydroxyalkyl group the resulting product is practically devoid of vanilla flavor.

When compositions contemplated by the present invention, as for example the normal butyl ether of protocatechuic aldehyde are substituted for vanillin in the formula set forth above, a product is obtained which is acrid, pungent and otherwise lacking the characteristic pleasant taste of a vanilla bean extract. I have found, however, that the products hereinabove enumerated may be employed advantageously as flavoring compositions to impart a flavor which is of the vanilla genus and which may be used in quantities that are substantially less than those now employed in the case of vanillin. Thus, for example, in the case of the normal butyl ether of protocatechuic aldehyde approximately .8 ounce of the normal butyl ether of protocatechuic aldehyde (melting point 43.2° C.) and 1-2 ounces of coumarin are dissolved in 2.5 gallons of grain alcohol which is then diluted to approximately 10 gallons with sweetened water. For this purpose 1.5 pounds of sugar per gallon of finished extract will be found adequate. The resulting mixture may be employed as a flavoring extract in lieu of ordinary vanilla bean extract. The pungent and acrid taste which results when the butyl ether is employed in substantially greater amounts is absent and a pleasant vanilla-like flavor is developed.

Another embodiment of the invention consists in dissolving approximately 2 ounces of the normal propyl ether of protocatechuic aldehyde (melting point 82.8°–84.2° C.) and .5 ounce of coumarin in a gallon of grain alcohol which is diluted to 10 gallons with water in which there is dissolved approximately 15 pounds of sugar. The coumarin may be omitted from the formula as also in the formula specified in connection with the butyl ether if desired.

Another embodiment of the invention involves fortifying the natural vanilla extract. For example a half ounce of the normal propyl ether of protocatechuic aldehyde may be dissolved in one gallon of vanilla bean extract. The resulting solution will be found to be substantially stronger and may therefore be used in lesser amounts for flavoring purposes than would otherwise be possible. The corresponding isopropyl ether (melting point 46.4°–46.9° C.) may be substituted in the above examples.

Because of the fact that the compositions contemplated by this invention are less volatile than vanillin they are more effective in flavoring of foodstuffs which are subjected to elevated temperatures in the course of their preparation. Thus, for example, in the manufacture of cookies and cakes the tendency of the flavor of vanillin or vanilla bean extract to be dissipated at the baking temperature is minimized by employing compositions of the present invention and a permanent flavor of vanilla in the final product is thereby more definitely assured.

The manner of using these flavors is analogous to that now commonly employed in flavoring foodstuffs with vanilla extract or vanillin. In general, it is customary to introduce the vanillin in the form of a solution in order to assure uniform distribution of the flavor throughout the product. By way of example: a flavoring composition, such as is described above, employing the normal butyl ether of protocatechuic aldehyde may be used to flavor a vanilla ice cream; for this purpose one ounce of solution is incorporated per gallons of ice cream mix.

In general, the flavoring material is incorporated in an amount which is approximately equivalent in strength to a vanilla bean extract. The potency of the compositions contemplated by the invention differs although the procedure involved in the preparation of the flavors is analogous. In general, substantially less of the compositions contemplated by the present invention are employed as compared to the quantity of vanillin which is required in the preparation of an extract to develop approximately the same flavoring power. Thus, in the case of the normal butyl ether, approximately one-tenth by weight is required.

Various methods may be employed in the preparation of the compositions employed in practicing the present invention. These methods form no part of the present invention. One method involves the preparation of the mono alkyl ether of catechol which subsequently is condensed according to the Geigy reaction (D. R. P. 105,798) with formaldehyde. The resulting condensation product is refined and purified by methods analogous to those employed in the preparation of vanillin.

Another method of preparing the compositions consists in forming the benzene sulphonic acid ester of protocatechuic aldehyde wherein the benzene sulphonic acid is joined to the hydroxy group which is in para position with respect to the aldehyde group, subsequently reacting the free hydroxyl group with an alkylating agent such as propyliodide, butyliodide, etc., after which the product is saponified whereby sulphonic acid radical is split off and the alkyl ether of protocatechuic aldehyde produced. Other methods of preparing these compounds may be employed if desired without departing from the spirit of this invention which contemplates foodstuffs embodying flavorings of a vanilla genus which are propyl, butyl, amyl, hexyl, heptyl and octyl ethers of protocatechuic aldehyde.

From the foregoing description it will be apparent that we have provided a method of imparting a vanilla-like flavor to foodstuffs and have described representative embodiments of the invention. It will likewise be apparent that the constituents contemplated herein are of inordinate flavoring power and may be employed in very much smaller quantities than is required in the case of present day flavoring compositions.

What we claim is:

1. A flavoring composition for foodstuffs embodying a material having the following structural formula:

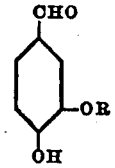

where R is a propyl, butyl, amyl, hexyl, heptyl or octyl group.

2. A foodstuff wherein there has been incorporated a material as defined in claim 1.

3. A flavoring for foodstuffs consisting of an alcoholic solution of a material having the structural formula:

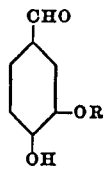

where R is a propyl, butyl, amyl, hexyl, heptyl or octyl group.

4. A flavoring composition for foodstuffs embodying a material having the following structural formula:

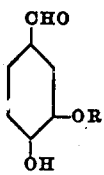

where R is an amyl group.

5. A flavoring composition for foodstuffs embodying a material having the following structural formula:

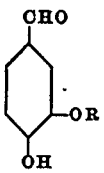

where R is a hexyl group.

6. A flavoring composition for foodstuffs embodying a material having the following structural formula:

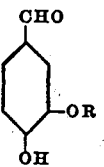

where R is a heptyl group.

7. A flavoring composition for foodstuffs embodying a material having the following structural formula:

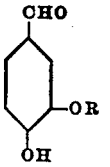

where R is an alkyl group having at least three carbon atoms.

8. A flavoring for foodstuffs consisting of an alcoholic solution of coumarin and a material having the structural formula:

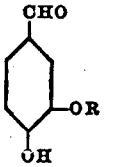

where R is a propyl, butyl, amyl, hexyl, heptyl or octyl group.

LUCAS P. KYRIDES.
HENRY H. RETAILLIAU.